United States Patent
Shi et al.

(10) Patent No.: US 10,104,187 B2
(45) Date of Patent: Oct. 16, 2018

(54) SYSTEM, COMPUTER PROGRAM, AND METHOD FOR DIVIDING SERVICES INTO SUBSETS BASED ON INTERDEPENDENCIES

(71) Applicant: Futurewei Technologies, Inc., Plano, TX (US)

(72) Inventors: Hang Shi, Fremont, CA (US); Huida Dai, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 97 days.

(21) Appl. No.: 15/183,694

(22) Filed: Jun. 15, 2016

(65) Prior Publication Data

US 2017/0366623 A1 Dec. 21, 2017

(51) Int. Cl.
*H04L 29/08* (2006.01)

(52) U.S. Cl.
CPC .............. *H04L 67/16* (2013.01); *H04L 67/32* (2013.01)

(58) Field of Classification Search
CPC ..... H04L 41/0681; H04L 41/08; H04L 67/28; H04L 67/16; H04L 61/00; H04L 41/0246
See application file for complete search history.

(56) References Cited

U.S. PATENT DOCUMENTS

| | | | |
|---|---|---|---|
| 6,286,047 B1 * | 9/2001 | Ramanathan | H04L 29/12066 370/229 |
| 6,336,138 B1 * | 1/2002 | Caswell | H04L 41/12 345/440 |
| 7,756,940 B2 * | 7/2010 | Sagawa | G06Q 10/10 709/203 |
| 8,225,282 B1 * | 7/2012 | Massoudi | G06F 8/31 717/104 |
| 8,817,625 B1 | 8/2014 | Zhang et al. | |
| 9,137,161 B2 | 9/2015 | Zhang et al. | |
| 9,774,654 B2 * | 9/2017 | Tran | G06F 17/30958 |
| 9,955,332 B2 * | 4/2018 | Raleigh | H04W 4/50 |
| 2003/0144860 A1 * | 7/2003 | Casati | G06Q 10/10 709/223 |
| 2003/0191679 A1 * | 10/2003 | Casati | G06Q 10/0631 705/7.12 |
| 2005/0091576 A1 * | 4/2005 | Relyea | G06F 9/4443 715/211 |
| 2006/0206595 A1 * | 9/2006 | Zarzycki | H04L 67/2823 709/220 |

(Continued)

OTHER PUBLICATIONS

U.S. Appl. No. 13/556,456, entitled "Chaining of Inline Services Using Software Defined Networking," filed Jul. 24, 2012.

(Continued)

*Primary Examiner* — Sargon Nano
(74) *Attorney, Agent, or Firm* — David William Roe (57) ABSTRACT

A system, computer program, and method are provided for service placement in a network. Information is stored on a collection of services that are configured to be performed in a dynamic order. Further, one or more interdependencies between at least a portion of the services are identified. Still yet, the collection of services is divided into one or more subsets of the services, based on the one or more interdependencies. A plurality of parts of at least one of the one or more subsets of the services is combined, resulting in one or more composite subsets of the services that are outputted to at least one of a plurality of service nodes.

28 Claims, 6 Drawing Sheets

(56) References Cited

U.S. PATENT DOCUMENTS

| | | | |
|---|---|---|---|
| 2010/0088665 A1* | 4/2010 | Langworthy | G06F 8/43 717/104 |
| 2011/0145861 A1* | 6/2011 | Moon | H04N 21/26283 725/39 |
| 2011/0234595 A1* | 9/2011 | Poston | G06T 11/20 345/440 |
| 2013/0036035 A1* | 2/2013 | Dever | G06Q 50/18 705/32 |
| 2013/0272305 A1 | 10/2013 | Lefebvre et al. | |
| 2013/0276048 A1* | 10/2013 | Krasic | H04N 21/2187 725/116 |
| 2014/0215074 A1 | 7/2014 | Zhang et al. | |
| 2014/0355436 A1 | 12/2014 | Zhang et al. | |
| 2015/0127628 A1* | 5/2015 | Rathod | H04W 4/21 707/710 |
| 2015/0163150 A1 | 6/2015 | Beheshti-Zavareh et al. | |
| 2016/0189102 A1* | 6/2016 | Schreiber | G06Q 10/0834 705/338 |
| 2017/0201850 A1* | 7/2017 | Raleigh | H04W 4/50 |

OTHER PUBLICATIONS

U.S. Appl. No. 13/751,826, entitled "Method and Apparatus for Placing Services in a Network," filed Jan. 28, 2013.

U.S. Appl. No. 13/904,539, entitled "Method and System of Bandwidth-aware Service Placement for Service Chaining," filed May 29, 2013.

VMWare, "VMWare Distributed Resource Scheduler (DRS): Dynamic Load Balancing and Resource Allocation for Virtual Machines," Product Datasheet, 2009, pp. 1-3 retrieved from http://www.vmware.com/files/pdf/VMware-Distributed-Resource-Scheduler-DRS-DS-EN.pdf.

Xi, S. et al., "RT-Open Stack: CPU Resource Management for Real-Time Cloud Computing," 2015, pp. 1-8, retrieved from http://www.cse.wustl.edu/~lu/papers/cloud15-rtopenstack.pdf.

Zaharia, M. et al., "Resilient Distributed Datasets: A Fault-Tolerant Abstraction for In-Memory Cluster Computing," 2012, pp. 1-14, retrieved from http://www.cs.berkeley.edu/~matei/papers/2012/nsdi_spark.pdf.

* cited by examiner

```
Make_composite_service_graph(G, G')
        // G and G' are the original subscriber service graph and generated composite service graph respectively
        // V[G], Adj[G, u] is the vertex information and adjacency information for a Graph G.
        // DependenceAdj [G, u] is the interdependency information of Service Graph G. It is initialized to nil.

// create inter-dependency adjacency information                                    ← 550
        for each vertex u ∈ V[G] do  ←________________ 552
                for each vertex v ∈ V[G] – u do
                        if v is dependent on u then
                                DependenceAdj [G, u] = DependenceAdj [G, u] + v
                        endif
                endfor
        endfor
                                                                                    ← 554
        for each vertex u ∈ V[G] do
                state[u] = "undiscovered" //used to track whether u node has been visited
                parent[u] = nil // the parent node of node u
        endfor // do breadth first search to construct Composite Service Graph
        for each vertex k ∈ V[G] do
                if state[k] != "undiscovered"  ←________ 556
                        continue
                endif Q = {k} // Q is a queue used to facilitate breadth first search
                P = {k} // P is a set used to record the connected nodes of current sub-graph
                SG[u] = {u} //SG[u] is sub-graph starting with u as first node
                V[G'] = V[G'] + k // create sub-graph with k as the representing node
                Adj[G', k] = { } // record adjacency info for nodes that have connectivity outside this sub-graph
                                         ← 558
                while Q != ∅ do  ←
                        u = dequeue[Q]
                        for each v ∈ DependenceAdj [u] do
                                Adj[G', k] = Adj[G', k] + v
                                P = P + v
                                if state[v] = "undiscovered" then
                                        state[v] = "discovered"
                                        parent[v] = k
                                        Q = Q + v
                                endif
                        end for
                        state[u] = "processed"
                end while
                //update sub-graph and composite service graph information
                for each m ∈ P do
                        for each n ∈ Adj[G, u] do  ←______ 560
                                if n ∈ P then    // m and n are in same sub-graph
                                        add edge(m, n) as internal edge of sub-graph SG[u]
                                else // m and n are not in same sub-graph
                                        add edge(m, n) as external edge of SG[u] in global graph
                                        add metric information of node n to node u in V[G'] for graph G`
                                endif
                        end for
                end for
        end for //update composite service graph information
        for each u in V[G]  ←______ 562
                for each v in Adj[G`, u]
                        Adj[G`, u] = Adj[G`, u] – v + parent[v]
                end for
        end for
```

SYSTEM, COMPUTER PROGRAM, AND METHOD FOR DIVIDING SERVICES INTO SUBSETS BASED ON INTERDEPENDENCIES

FIELD OF THE INVENTION

The present invention relates to network service management, and more particularly to network service placement.

BACKGROUND

Network functions virtualization (NFV) (also known as virtual network function (VNF)) offers a new way to design, deploy and manage networking services. NFV decouples the network functions, such as network address translation (NAT), firewalling, intrusion detection, domain name service (DNS), and caching, to name a few, from proprietary hardware appliances so they can run in software. Typically, in mobile wireless network, subscriber service placement is accomplished using a service chain approach. Such approach is conventionally applied in an environment including a network with a number of network devices, where the network devices offer a set of services to subscribers. Each subscriber of the network utilizes a subset of the set of services, and the subset of such set of services is included in a chain of services for each subscriber. An order of such chain of services is typically not predefined, and traversing the plurality of network devices during service execution often causes delay to the subscribers.

To this end, service chaining is often required if subscriber traffic needs to go through multiple in-line services. Moreover, if more than one chain of services is possible, a network operator typically must configure the network to direct the right traffic through the right in-line service path. A service allocation processor is often used for allocating the services to the network devices, using a service selector configured to order the services from a most-utilized service to a least-utilized service. During use, the service selector is also configured to select services from the most-utilized service to the least-utilized service.

Further, for each service, a service placing logic of the service allocation processor is configured to select a network device of the network for each service so that placing each service in the network adds a minimum sum of additional delays, based on services already placed in the network. Bandwidth may also be considered when placing each service. In addition, a path planner of the service allocation processor is configured to update a path for each subscriber to reflect the placed service.

Thus, in such systems, utilization, delay and/or bandwidth are considered when placing services in the network. One possible limitation of such approach, however, is that, during service placement, it does not consider interdependencies among the services including, but not limited to data locality. Therefore, such system is not always capable of achieving optimal performance.

SUMMARY

A system, computer program, and method are provided for service placement in a network. Information is stored on a collection of services that are configured to be performed in a dynamic order. Further, one or more interdependencies between at least a portion of the services are identified. Still yet, the collection of services is divided into one or more subsets of the services, based on the one or more interdependencies. A plurality of parts of at least one of the one or more subsets of the services is combined, resulting in one or more composite subsets of the services that are outputted to at least one of a plurality of service nodes.

Also provided is an apparatus including memory configured to store information on a collection of services that are configured to be performed in a dynamic order. A policy manager is in communication with the memory, and is configured to identify one or more interdependencies between at least a portion of the services. Also provided is a service orchestrator in communication with the policy manager. The service orchestrator is configured to: divide the collection of services into one or more subsets of the services, based on the one or more interdependencies, and combine a plurality of parts of at least one of the one or more subsets of the services, resulting in one or more composite subsets of the services. A controller is in communication with the service orchestrator, and is configured to output the one or more composite subsets of the services to at least one of a plurality of service nodes.

Another apparatus is provided including memory configured to store information on a collection of services that are configured to be performed in a dynamic order. One or more processors is in communication with the memory, and is configured to: identify one or more interdependencies between at least a portion of the services; divide the collection of services into one or more subsets of the services, based on the one or more interdependencies; and combine a plurality of parts of at least one of the one or more subsets of the services, resulting in one or more composite subsets of the services. A controller is in communication with the one or more processors, and is configured to output the one or more composite subsets of the services to at least one of a plurality of service nodes.

Still yet, a service placement system is provided with a non-transitory memory storage comprising instructions, and one or more processors in communication with the memory storage. The one or more processors execute the instructions to: store information on a collection of services that are configured to be performed in a dynamic order; identify one or more interdependencies between at least a portion of the services; divide the collection of services into one or more subsets of the services, based on the one or more interdependencies; combine a plurality of parts of at least one of the one or more subsets of the services, resulting in one or more composite subsets of the services; and output the one or more composite subsets of the services to at least one of a plurality of service nodes.

In a first embodiment, at least one other interdependency may be received from a user. Further, the collection of services may be divided into the one or more subsets of the services, based on the at least one other interdependency from the user. In one aspect of the present embodiment, the information on the collection of services may include a graph (e.g. service graph, etc.), an array, a table, or a digital structure.

In a second embodiment (which may or may not be combined with the first embodiment), at least one rule may be received from a user. The collection of services may thus be divided into one or more subsets of the services, based on the at least one rule from the user.

In a third embodiment (which may or may not be combined with the first and/or second embodiments), the plurality of service nodes may be autonomous and/or portable. Further, the one or more composite subsets of the services may be configured for being moved from at least one service node to at least one other service node. As a further option, a first one or more of the interdependencies may be managed by the at least one service node, while at least one processor (that performs the identifying, dividing, combining, etc.) may be configured for managing a second one or more of the interdependencies.

In a fourth embodiment (which may or may not be combined with the first, second, and/or third embodiments), a cost associated with the one or more composite subsets of the services may be identified. To this end, the one or more composite subsets of the services may be output to the at least service node, based on the cost. Optionally, the cost may include a cost in resources (e.g. data processing, network bandwidth, storage capacity, and/or input/output (I/O) resources, etc.).

In a fifth embodiment (which may or may not be combined with the first, second, third, and/or fourth embodiments), the one or more interdependencies may be received from at least one user, or automatically generated utilizing heuristics.

In a sixth embodiment (which may or may not be combined with the first, second, third, fourth, and/or fifth embodiments), the one or more composite subsets of the services may include a metric that is a sum of a plurality of metrics associated with the one or more subsets of the services. As a further option, the one or more composite subsets of the services may include a metric that is a largest one of a plurality of metrics associated with the one or more subsets of the services.

In a seventh embodiment (which may or may not be combined with the first, second, third, fourth, fifth, and/or sixth embodiments), the one or more composite subsets of the services may be output utilizes a first fit decreasing (FFD) bin pack algorithm.

To this end, in some optional embodiments, one or more of the foregoing features of the aforementioned system, computer program, and/or method may afford a centralized framework by utilizing at least one processor that performs one or more of the identifying, dividing, and combining in a generic manner that allows the centralized framework to perform such functions on any one or more of the collection of services (e.g. service graphs, etc.). Further, the one or more composite subsets of the services may be outputted to a distributed group of service nodes that autonomously utilize the composite subsets. This may, in turn, result in more optimal performance (e.g. less delay, more bandwidth, etc.) that would otherwise be foregone in systems that lack an ability to effectively manage service interdependencies. It should be noted that the aforementioned potential advantages are set forth for illustrative purposes only and should not be construed as limiting in any manner.

BRIEF DESCRIPTION OF THE DRAWINGS

FIG. 5A illustrates exemplary pseudocode for creating a composite sub-graph from a service graph, in accordance with one embodiment.

DETAILED DESCRIPTION

Figure 1:
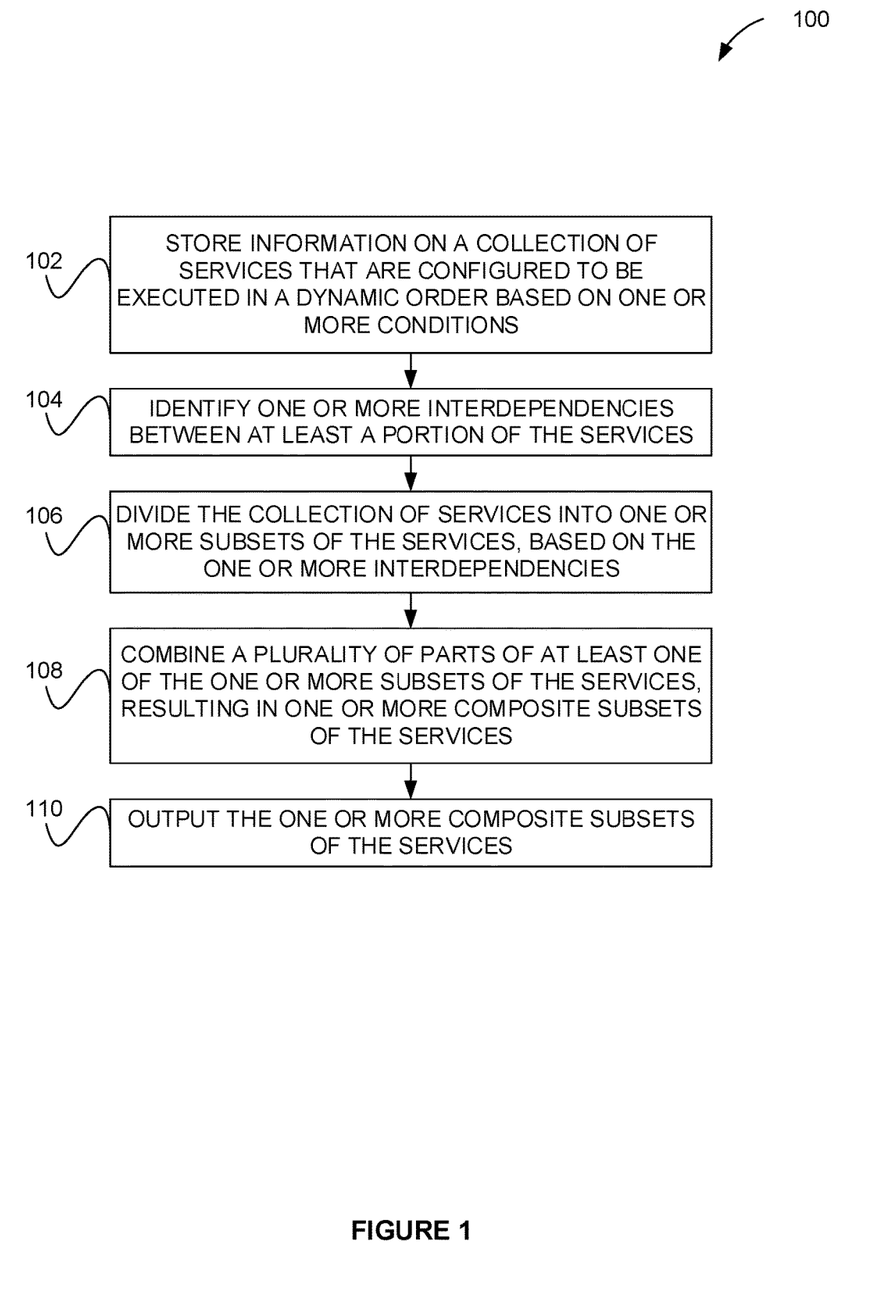
FIG. 1 illustrates a method for dividing a collection of services into one or more subsets of services based on one or more interdependencies, in accordance with one embodiment.

FIG. 1 illustrates a method 100 for dividing a collection of services into one or more subsets of services based on one or more interdependencies, in accordance with one embodiment. In the context of the present description, such services may include any service that is capable of being provided by any combination of hardware and/or software. Non-limiting examples of such services may include, but are not limited to deep packet inspection (DPI), video optimization (VO), logging, metering, charging, quality of service (QoS), firewall (FW), virus scanning (VS), intrusion detection and prevention (IDP), network address translation (NAT), data analytics, and/or any other type of service, for that matter. In one embodiment, the collection of services may even include sub-services of an encompassing service. For example, sub-services of a DPI, VO, etc. may constitute a collection of services.

Also in the context of the present description, the aforementioned interdependencies may each involve any situation where at least one aspect of one service depends on at least one aspect of another service. Examples of interdependencies may, in various embodiments, include, but are not limited to ordering of service execution where a service must precede another service, data locality where a service requires data from another service, result dependency where a service requires a result of another service, and health/load status where a service may have to change paths based on a status of another service.

In various embodiments, such dependency may be mandatory or optional. One example of a mandatory dependency may involve an ordering of a subscriber's services that operators desire to enforce. A second example of a mandatory dependency may involve a NAT service where, if some services require results from previous services, the ordering must be fixed. A third example involving an optional dependency may include two services sharing a same database, and one service needing to use data generated from a previous service. In different embodiments, such services may be transparent or nontransparent to end users and may be specified explicitly or implicitly.

As shown in FIG. 1, information is stored in memory where the information is on a collection of services that are configured to be performed in a dynamicorder based on one more conditions. See operation 102. As an option, the services may be performed in the dynamic order based on one or more conditions. In different embodiments, such conditions may include time-based conditions (e.g. where one service is performed before another, etc.), status-based conditions (e.g. where a service is performed based on a status of the service or another service, etc.), data-based conditions (e.g. where a service is performed only after certain data is available, etc.), conditions related to the above-mentioned interdependencies, and/or any other type of condition, for that matter. In various embodiments, the memory may include any volatile and/or non-volatile memory and may even include structured memory (e.g. database, etc.). More information regarding exemplary types of memory will be set forth later during the description of subsequent embodiments.

In the context of the present description, the condition-based performance of the services in the dynamic order may be accomplished in any manner that results in at least a portion of a service being performed after at least a portion of another service, as a result of a state of: one or both of the services, and/or any other aspect of a system or user, for that matter. Also in the context of the present description, the information on the collection of services may include any data that includes a portion or all of the services themselves and/or any data derived therefrom. For example, in one embodiment, the information may describe one or more aspects of the services. Further, in a specific optional embodiment, the information on the collection of services may include a graph (e.g. service graph, etc.). In other embodiments, the information may include an array, a table, and/or a digital structure.

As indicated in operation 104, one or more interdependencies between at least a portion of the services are identified. In one embodiment, the one or more interdependencies may be automatically identified. In another embodiment that will be described hereinafter in greater detail, at least one other interdependency may be received from a user, utilizing at least one input device.

Thereafter, the collection of services is divided into one or more subsets of the services, based on the one or more interdependencies. See operation 106. In the context of the present description, the division may refer to any process involving one or more of the services that results in the one or more subsets of the services. Further, such division may be based on the one or more interdependencies in any desired manner. Just by way of example, the division may be such that each service subset includes a group of two or more services where each service has at least one interdependency with at least one other service in the group. Further, in an embodiment where the collection of services takes the form of a service graph, the subsets of services may each take the form of a sub-graph.

In various embodiments, the collection of services may be divided into one or more subsets of the services in a completely automatous manner or utilizing various input from a user. For instance, as mentioned earlier, at least one other interdependency may be received from a user, utilizing at least one input device (examples of which will be described hereinafter in the context of different embodiments). As a further option, at least one rule may be received from the user, utilizing the at least one input device. By this design, the collection of services may be divided into the one or more subsets of the services, based on the at least one other interdependency from the user and/or the at least one rule from the user.

With continuing reference to FIG. 1, a plurality of parts of at least one of the one or more subsets of the services is combined in operation 108 resulting in one or more composite subsets of the services. In various embodiments, one or more of the operations 104, 106, and/or 108 may be performed utilizing at least one processor. Such at least one processor may include a general purpose and/or application specific processor, graphics processor, central processing unit (CPU), one or more distributed processors, and/or any other device capable of performing one or more of the operations 104, 106, and/or 108.

In one embodiment, the abovementioned parts of the subset(s) of the services may include any portion thereof that can be combined in any manner that results in the composite subset(s) of the services. Further, in the context of the present description, the composite subset(s) of the services may include any subset of the services for which the information thereon has been modified in some manner. Non-limiting examples of such modifications may involve condensing, aggregating, normalizing, and/or any other altering of such information. For instance, in one non-limiting embodiment (that will be elaborated upon later), the composite subset(s) of the services may include information on a sum of costs associated with multiple services, instead of a separate itemization of such costs for each of such services.

To this end, the one or more composite subsets of the service are outputted in operation 110, utilizing at least one output device. In various embodiments, the at least one output device may include a display, printer, network/output interface, and/or any other device capable of outputting the one or more composite subsets of the services.

As an option, the one or more composite subsets of the services may be output to at least one of a plurality of service nodes. In operation, the one or more composite subsets of the services may be configured for being utilized by the at least one node. Further, the one or more composite subsets of the services may be output (e.g. distributed, etc.) in any desired manner. For instance, a cost associated with the one or more composite subsets of the services may be identified. To this end, the one or more composite subsets of the services may be output to the at least one node, based on the cost. Optionally, the cost may include a cost in resources. For example, in various embodiments, such resources may involve data processing, network bandwidth, storage capacity, and/or input/output (I/O) capabilities.

In various embodiments, the plurality of nodes may be autonomous and/or portable. For example, a failure in a first one of the plurality of nodes does not necessarily affect a second one of the plurality of nodes. Further, the one or more composite subsets of the services may be configured for being moved from at least one node to at least one other node. As a further option, a first one or more of the interdependencies may be managed by the at least one node, and at least one processor (that performs operations 104, 106, and/or 108) may be configured for managing a second one or more of the interdependencies, such that interdependency management is allocated between the at least one node and processor. In other words, in one possible embodiment, one or more services [and any associated interdependency(ies)] may be reserved by a centralized system (that performs operations 104, 106, and/or 108) for being handled by such centralized system, while remaining services may be allocated to the service node(s).

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

For example, in some optional embodiments, one or more of the foregoing features may afford a centralized framework by utilizing at least one processor that performs one or more of operations 104, 106, and/or 108 in a generic manner that allows the centralized framework to perform such functions on any one or more of the collection of services (e.g. service graphs, etc.). Further, the one or more composite subsets of the services may be outputted to a distributed group of nodes that autonomously utilize the composite subsets. This may, in turn, result in more optimal performance (e.g. less delay, more bandwidth, etc.) that would otherwise be foregone in systems that lack an ability to effectively manage service interdependencies.

Figure 2:
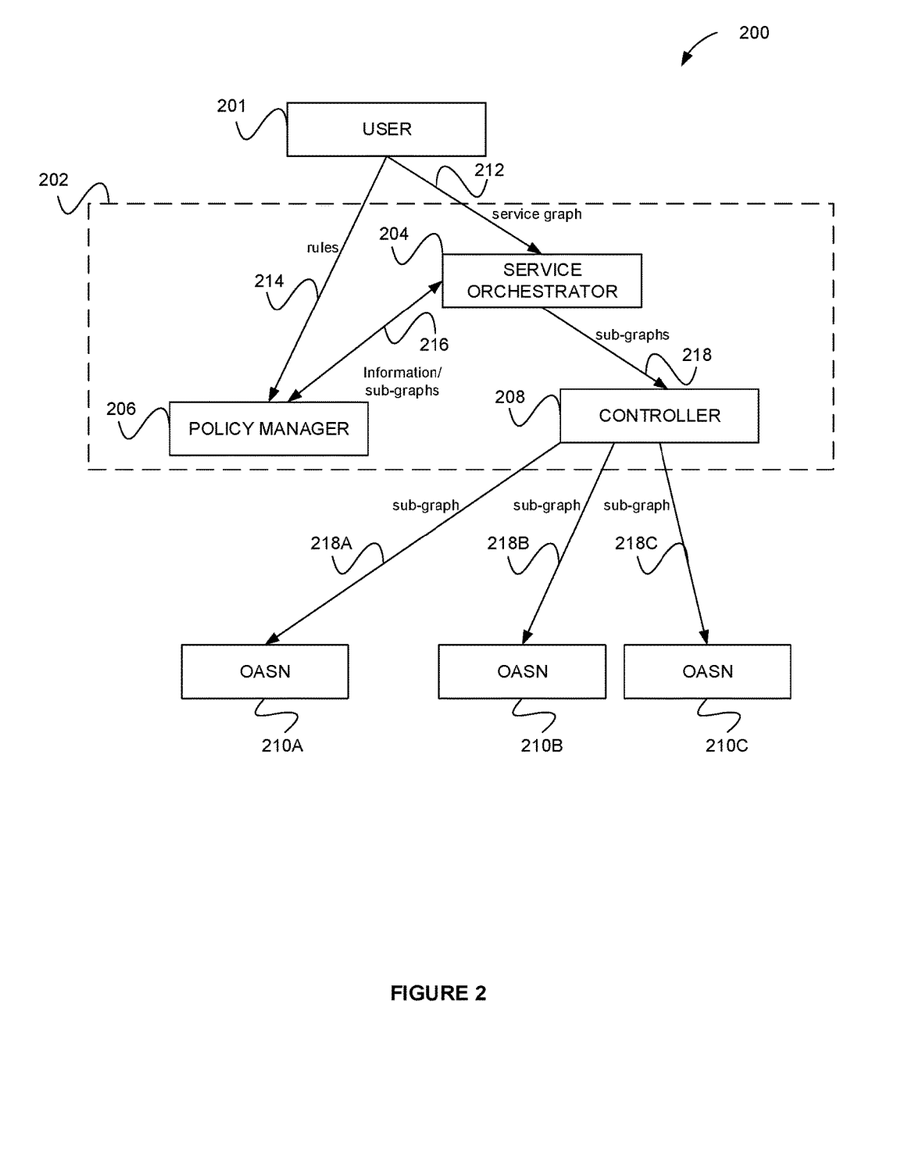
FIG. 2 illustrates a centralized system for dividing a collection of services into one or more subsets of services based on one or more interdependencies, in accordance with one embodiment.

FIG. 2 illustrates a centralized system 200 for dividing a collection of services into one or more subsets of services based on one or more interdependencies, in accordance with one embodiment. As an option, the centralized system 200 may be implemented using any one or more features of any one or more of the embodiments set forth in any previous and/or subsequent figure(s) and/or the description thereof. However, it is to be appreciated that the centralized system 200 may be implemented in the context of any desired environment.

As shown, the centralized system 200 includes at least one user 201 that has access to a dynamic subscriber service placement apparatus 202 that, in turn, includes a service orchestrator 204, a policy manager 206, and a controller 208. The controller 208 of the dynamic subscriber service placement apparatus 202 is further shown to communicate with a plurality of nodes in the form of open autonomous service nodes (OASNs) 210A, 210B, 210C.

In one embodiment, the service orchestrator 204, policy manager 206, and controller 208 may include logical (e.g. software and/or hardware, etc.) components of a single, centralized physical and/or virtual machine. For example, the policy manager 206 may be deployed into the same machine as the service orchestrator 204. In another embodiment, the policy manager 206 may be deployed into the same machine as the controller 208. It is also possible that the logical functionality of one component may be implemented together into the same component as another component. In other embodiments, the apparatus 202 may be distributed such that one or more of the foregoing components are remotely positioned.

In use, the policy manager 206 of the apparatus 202 is configured to receive one or more rules 214 (e.g. policies, etc.) from the user 201. In one embodiment, such rules may include policy information for facilitating service graph deployment. For example, such policy information may dictate how traffic enforcement should be done and how resources should be allocated and used. This may include interdependencies among the services where such interdependency may include, but is not limited to traffic execution order and data locality dependency. These dependencies may also be input into the policy manager 206 by users explicitly, and/or the policy manager 206 may use heuristics to generate the same.

As further shown, the service orchestrator 204 of the apparatus 202 is configured to receive one or more collection of services (e.g. service graph(s) 212, etc.) from the user 201. Such service graph 212 may or may not be from different vendors and may be configured to be hosted in dedicated physical hardware, virtual machines, containers, and/or any other medium. Further, the service graph 212 may have different requirements in terms of data storage, computation, I/O, throughput, packet inspection capabilities, etc. and, therefore, may be heterogeneous.

In such a heterogeneous deployment environment, some services may require certain conditions to be met in order for them to have a smooth and successful execution. For example, one service may only execute on certain hardware from a certain vendor, and thus can only be deployed on certain physical nodes. Information 216 on such details may be fed from the service orchestrator 204 to the policy manager 206, as shown.

With such input, the policy manager 206 and the service orchestrator 204 of the apparatus 202 cooperate to generate subsets of the service graph 212 (e.g. sub-graphs 218, etc.) by identifying interdependencies, dividing the services in to subsets based on such interdependencies (and any other user input), and combining parts of the subsets. In one embodiment, this may be accomplished by the service orchestrator 204 automatically identifying interdependences within the service graph 212 (in addition to any manually-identified interdependencies received from the user 201). With such interdependences identified, the service orchestrator 204 may further cooperate with the policy manager 206 to divide the services into subsets based on such interdependencies (and any other user input including the rules 214), and combine parts of the subsets so that the sub-graphs 218 may be output to the controller 208. To the extent that the policy manager 206 generates the sub-graphs 218, such sub-graphs 218 may be fed back to the service orchestrator 204, prior to being output to the controller 208.

In use, the controller 208 serves to identify a cost (in terms of resources, delay, efficiency and/or other factors) associated with each of the sub-graphs 218, as well as resource capacity of each of the OASNs 210A, 210B, 210C and/or other factors. This may be accomplished by querying the OASNs 210A, 210B, 210C and/or receiving one or more resource information therefrom. In any case, the controller 208 selectively sends different sub-graphs 218A, 218B, 218C to different ones of the OASNs 210A, 210B, 210C, based on such resource requirements and capabilities.

By this design, the centralized system 200 is configured for modeling subscriber services in a mobile network as a directed acyclic graph (DAG) based on interdependencies among services, building undirected dependency sub-graphs 218 after creating composite services, and distributing the sub-graphs 218 into a cluster of OASNs 210A, 210B, 210C. Each of the OASNs 210A, 210B, 210C may be based on a micro-service architecture with services running as containers to best leverage a maximal concurrency potential from multi-CPU cores inside underlying hosts, etc.

Thus, the interdependent services within the service graph 212 may be brought together as composite services in the same sub-graph 218 for distribution to the same OASN 210A, 210B, or 210C. In one embodiment, the centralized system 200 may exhibit a central intelligence by dynamically decomposing an overall service graph 212 into a number of the sub-graphs 218 while each OASN 210A, 210B, 210C remains autonomous in term of handling one or more of the service sub-graphs 218A, 218B, and/or 218C and supporting a heterogeneous architecture where resources from multiple clouds and appliances from different vendors are designated to take different workloads, etc.

To this end, a framework is provided that overcomes limitations in existing approaches that do not have a generic way of considering interdependency among services and are not able to leverage data locality. By running the sub-graphs 218 of composite services in different locations, the centralized system 200 is able to fully utilize a maximum potential of multiple cores in a processor in each OASN 210A, 210B, 210C. Further, when a failure occurs, only a related sub-graph 218A, 218B, and/or 218C is affected, and thus there is not necessarily a requirement to re-create all of the subscriber services.

Further, by modeling the subscriber service graph 212 into a DAG and dynamically decomposing and distributing the sub-graphs 218A, 218B, and/or 218C, a distributed architecture of a mobile service system is provided that eases failure isolation and supports rapid service insertion, as one or more of the sub-graphs 218A, 218B, and/or 218C is affected. Still yet, the system 200 maximizes a concurrency level to improve performance and scalability. Even still, a finer granular level of virtualization at the container level may be achieved, thus the system 200 is able to maximize a concurrency level and better utilize underlying physical resources such as multiple cores. The system 200 also increases a redundancy level by allowing each OASN 210A, 210B, 210C to implement its own redundancy mechanism.

Figure 3:
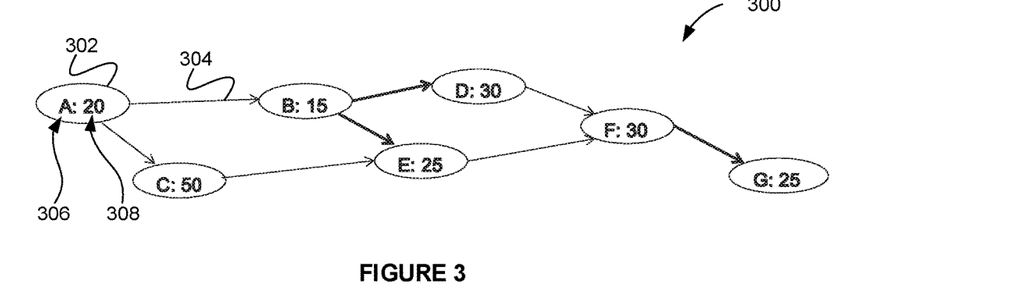
FIG. 3 illustrates a service graph, in accordance with one embodiment.

FIG. 3 illustrates a service graph 300, in accordance with one embodiment. As an option, the service graph 300 may be utilized in the context of any one or more of the embodiments set forth in any previous and/or subsequent figure(s) and/or description thereof. For example, in one embodiment, the service graph 300 may be utilized in the context of the service graph 212 of FIG. 2. However, it is to be appreciated that the service graph 300 may be utilized in the context of any desired environment.

As shown, the service graph 300 includes a plurality of services 302 each including an identifier 306 (e.g. A, B, C, D, etc.) as well as a numerical cost 308 (e.g. 20, 50, 15, etc.) associated therewith. As mentioned earlier, such numerical cost 308 may include a cost in terms of resources necessary for executing the associated service 302. Also included are a plurality of interdependencies 304 that each connect two services 302, thereby indicating that one of the two services 302 is dependent on the other service 302. As mentioned earlier, such interdependencies 304 may be manually received from a user in connection with the rules, and/or automatically identified via a centralized system. It should be noted that the foregoing information of the service graph 300 may be stored in any desired form. For example, such information may take the form of an array, table, digital structure, etc.

As mentioned earlier, a service orchestrator (e.g. the service orchestrator 204 of FIG. 2, etc.) may receive the service graph 300 as input from a user (e.g. operator, etc.). Further, the service graph 300 may be represented as a DAG that, in turn, represents a sequence or ordering of an execution of the relevant services 302. Each service 302 may represent one or more service functions running in underlying OASN nodes (e.g. OASNs 210A, 210B, 210C of FIG. 2, etc.) and may include attributes to represent configuration information and/or any other information required or helpful in performing the services 302.

In various embodiments, each node representative of one of the services 302 may have zero or more incoming edges, and zero or more outgoing edges. Each edge represents a desired execution sequence order and may contain match criteria. When multiple outgoing edges exist, a priority attribute for each edge may be used to decide execution order, along with first match semantics. The service graph 300 may thus be converted to a rule-based policy in a controller (e.g. controller 208 of FIG. 2, etc.) and then into a device policy at a host layer to facilitate data plane execution.

Further, a policy manager (e.g. policy manager 206 of FIG. 2, etc.) may be used to construct an original subscriber service. Specifically, as illustrated in FIG. 3, each node represents services 302 identified as A to G and the resultant service graph 300 represents an ordering of execution of such services 302. In addition, the thickened edges (e.g. B→D, B→E and F→G, etc.) represent a dependency, either explicitly or implicitly, found among the services 302. It should be noted that such interdependency does not necessarily have to include all adjacent services 302 that have traffic ordering dependency. They may also be generic enough to include metrics other than traffic ordering. In use, the aforementioned policy manager divides the services 302 into composited subsets (e.g. groups, etc.) that have interdependency. More information will now be set forth regarding such sub-graphs with constructed composited services.

Figure 4:
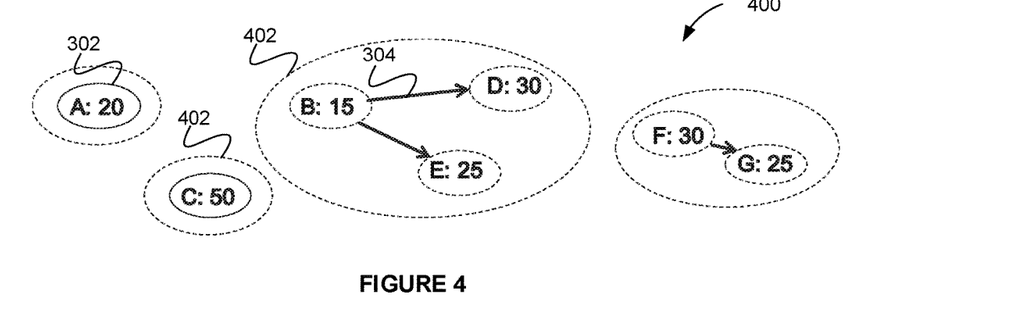
FIG. 4 illustrates an intermediate service graph divided into subsets (e.g. sub-graphs, etc.), in accordance with one embodiment.

FIG. 4 illustrates an intermediate service graph 400 divided into subsets (e.g. sub-graphs, etc.), in accordance with one embodiment. As an option, the intermediate service graph 400 may be implemented in the context of any one or more of the embodiments set forth in any previous and/or subsequent figure(s) and/or description thereof. For example, in one embodiment, the intermediate service graph 400 may be generated by the service orchestrator 204 and/or the policy manager 206 of FIG. 2. However, it is to be appreciated that the intermediate service graph 400 may be implemented in the context of any desired environment.

As shown, the services 302 are divided into sub-graphs 402, in the manner shown. In FIG. 4, Service B, D and E are grouped together and the sub-graphs 402 thus represent a composite service that is created because of the interdependencies represented via Edge BD and Edge BE. Further, Services F and G are grouped together because of the interdependency represented via Edge FG. Still yet, Service A and C are also grouped separately to form two of the sub-graphs 402, as shown.

Thus, each sub-graph 402 of the intermediate service graph 400 essentially represents a subset of the original subscriber service graph (e.g. service graph 300 of FIG. 3, etc.). Further, the metric of the composite service in each sub-graph 402 may be a function (in any way) of one or more of the metrics of the original service nodes. Just by way of example, in one embodiment, the metric of the composite service in each sub-graph 402 may be a sum of the metrics of the original service nodes. In another embodiment, the metric of the composite service in each sub-graph 402 may represent a largest of the metrics of the original service nodes (where the metrics involve delay, etc.). Further, the edges that involve service nodes that are outside of the service nodes that form the composite service sub-graph 402 may be used to form a final composite service graph, in a manner that will now be described.

Figure 5:
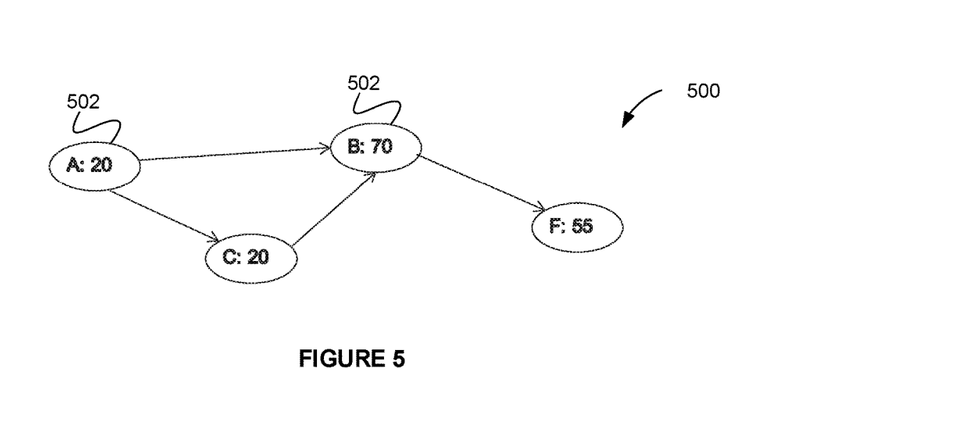
FIG. 5 illustrates a final service graph including a plurality of composite sub-graphs, in accordance with one embodiment.

FIG. 5 illustrates a final service graph 500 including a plurality of composite sub-graphs, in accordance with one embodiment. As an option, the final service graph 500 may be implemented in the context of any one or more of the embodiments set forth in any previous and/or subsequent figure(s) and/or description thereof. For example, in one embodiment, the final service graph 500 may be outputted by the service orchestrator 204 of FIG. 2, and further distributed via the controller of 208 of FIG. 2. However, it is to be appreciated that the final service graph 500 may be implemented in the context of any desired environment.

As shown, the final service graph 500 is a result of processing of sub-graphs (e.g. sub-graphs 402 of FIG. 4, etc.) that further combines the same into composite sub-graphs 502. By such combining, some information is therefore consolidated and/or lost/discarded. For example, edges among any internal nodes of the composite services of the composite sub-graphs 502 may no longer be visible in the final service graph 500.

In one embodiment, the final service graph 500 may be created by a policy manager (e.g. the policy manager 206 of FIG. 2, etc.) and then be submitted to a service orchestrator (e.g. the service orchestrator 204 of FIG. 2, etc.). Such service orchestrator may then send the final service graph 500 to a controller (e.g. the controller 208 of FIG. 2, etc.)

which, in turn, may map the composite sub-graphs 502 of the final service graph 500 from logical entities to OASN nodes (e.g. OASNs 210A, 210B, 210C of FIG. 2, etc.) based on capabilities, resource availability, and health/load status, for example.

In various embodiments, all services inside one of the composite sub-graphs 502 may be assigned to a single OASN. Further, multiple different composite sub-graphs 502 may be assigned to the same OASN. In each composite sub-graph 502, there may be multiple different services which may be scheduled by an OASN autonomously. In one embodiment, multiple services may be deployed on one OASN node by deploying each service as a different process (e.g. Tomcat or Jetty instances per service instance, etc.). In another embodiment, multiple service instances may be deployed in the same process (e.g. same JAVA virtual machine (JVM), as web applications or open service gateway initiative, etc.).

In various embodiments, the composite sub-graphs 502 may be assigned to an OASN in any desired manner. For example, a first fit decreasing (FFD) bin pack algorithm may be used to decide which OASN should host a service. As a subscriber service may be added or deleted from time-to-time in an unknown order, it may be beneficial to use an approximate algorithm, rather than an optimal solution, in some embodiments. In order to handle unique requirements in heterogeneous network function virtualization (NFV) systems, certain services may be deployed into certain types of physical or virtual machines, and such special services may be deployed before others. Thereafter, the services may be deployed in terms of a decreasing order of metrics, so that a service that requires larger metrics is deployed first while a service that requires smaller metrics is deployed last.

In another embodiment, each OASN may be viewed as a "bin" that has a fixed amount of resources to apply against sub-graphs assigned to it. In use, each metric (of a sub-graph) may be inserted one-by-one into a first bin that has room for it. If no bin has room, another bin may be initiated. By using the aforementioned FFD bin pack algorithm, a sub-graph that is larger (in terms of an amount of resources required) may be fit first in a bin, with while smaller sub-graphs may be used to "fill up" any space.

In one embodiment, the FFD bin pack algorithm may be implemented utilizing Equation #1 below. In another embodiment, a faster $O(n \times \lg n)$ implementation may be possible by using a binary tree or priority queue to keep track of any space remaining in each bin.

$$O(n \times \lg n + b \times n) \text{time}, \quad \text{Equation \#1}$$

where b is number of bins used, and b≤min(n, m), m is the maximum number of bins to be use and n is the number of sub-graphs to be placed into the bins.

In this embodiment, there may be n composite services with different costs, and m OASN nodes with different capabilities. A total number of the m OASN nodes may be enough to host such n composite services. Further, the composite services may be sorted in decreasing order of cost, so that the largest services are placed first and the smallest last. Still yet, each composite service may be inserted one-by-one into the first OASN node that has room for it. If no OASN node has room, the present technique may start with another OASN node out of the m OASN nodes. This may be implemented in $O(n \times \lg n + b \times n)$ time, where b is number of bins used, and b≤min(n, m), m is the maximum number of bins to be used and n is the number of sub-graphs to be placed into the bins.

FIG. 5A illustrates pseudocode 550 for creating a composite sub-graph from a service graph, in accordance with one optional embodiment. As an option, the pseudocode 550 may be implemented in the context of any one or more of the embodiments set forth in any previous and/or subsequent figure(s) and/or description thereof. For example, in one embodiment, the pseudocode 550 may be implemented by the service orchestrator 204 and the policy manager 206 of FIG. 2. However, it is to be appreciated that the pseudocode 550 may be implemented in the context of any desired environment.

As shown, the pseudocode 550 illustrates how an original service graph G may be processed to generate a composite service graph G'. Such original service graph G includes a plurality of service nodes V[G], and, for service node u, there is adjacency information Adj[G, u] that includes an array or list of all adjacent service nodes of service node u. Thus, the adjacency information Adj[G, u] of the original service graph G may be used to generate sub-graph adjacency information DependenceAdj[G, u].

In order to generate the adjacency information for the sub-graph DependenceAdj[G, u], an if-then loop 552 is carried out, as shown. Specifically, for each service node or vertex u, it is determined if another node v is dependent on it and, if so, such node v is added to the sub-graph adjacency information DependenceAdj[G, u]. Further, such adjacency information may include state information, as well as an indication as to whether there is a parent, etc. See code 554. Of course, this algorithm may vary in any desired manner.

Next, a BFS algorithm (as described earlier) is used to construct each sub-graph SG that, in turn, includes a plurality of service nodes P. This is accomplished utilizing a queue Q. In use, an if-then loop 556 is carried out for each undiscovered node, where the if-then loop 556 includes a nested while loop 558, as illustrated. Specifically, a plurality of service nodes V[G'] of the composite service graph G' are identified, along with adjacency information Adj[G', k] (similar to that described above) based on a representative service node k. Further, an additional nested if-then loop 560 is carried out to construct the appropriate edges of the sub-graph SG. Finally, the service nodes V[G'] of the composite service graph G' are identified via code 562 for updating the edge information in the sub-graph SG.

Figure 6:
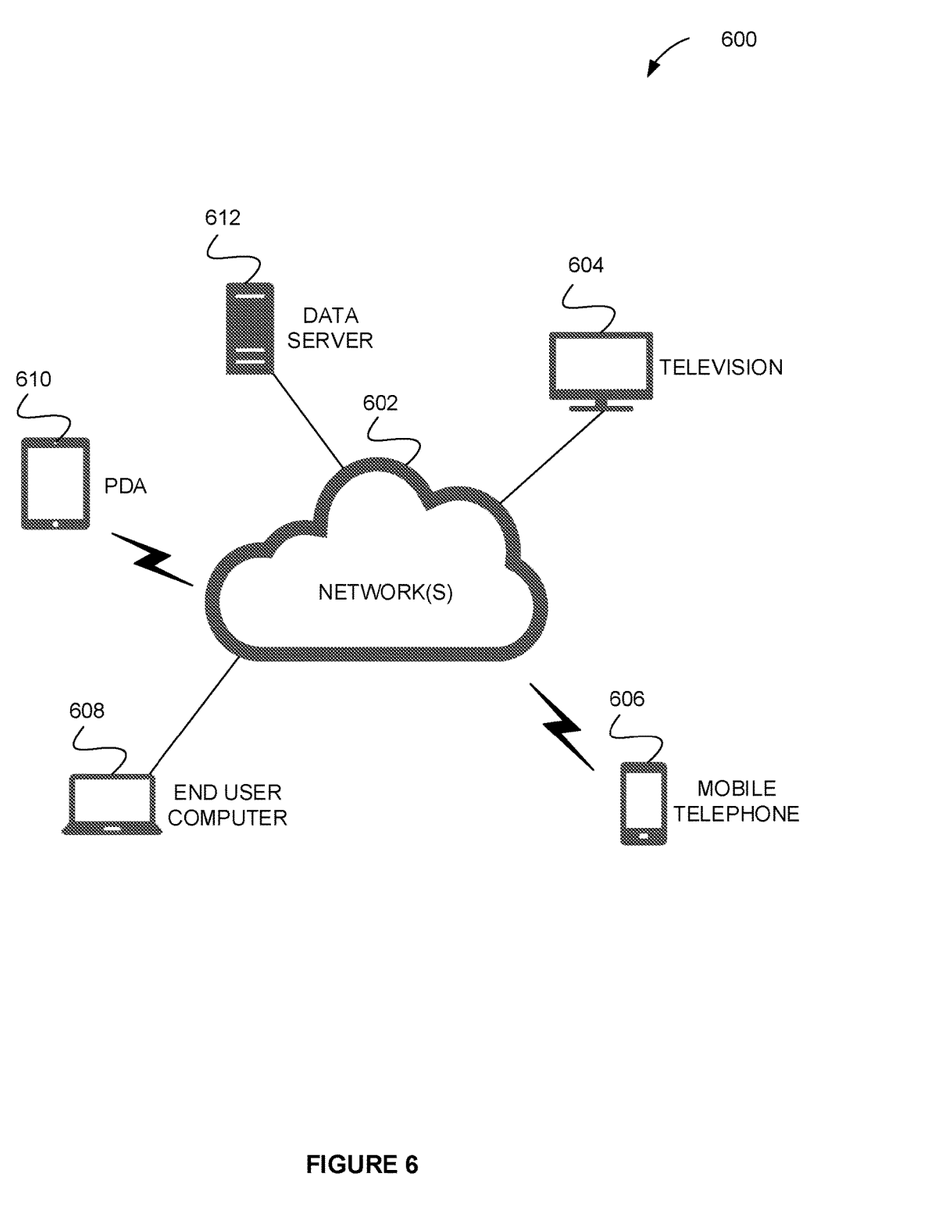
FIG. 6 illustrates a network architecture, in accordance with one embodiment.

FIG. 6 illustrates a network architecture 600, in accordance with one embodiment. In one possible embodiment, one or more features of the previously described embodiments may be deployed in the network architecture 600. However, it should be noted such environment is set forth for illustrative purposes only and should not be construed as limiting in any manner whatsoever.

As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 612 and an end user computer 608 may be coupled to the network 602 for communication purposes. Such end user computer 608 may include a desktop computer, lap-top computer, and/or any other type of logic. Still yet, various other devices may be coupled to the network 602 including a personal digital assistant (PDA) device 610, a mobile phone device 606, a television 604, etc.

Figure 7:
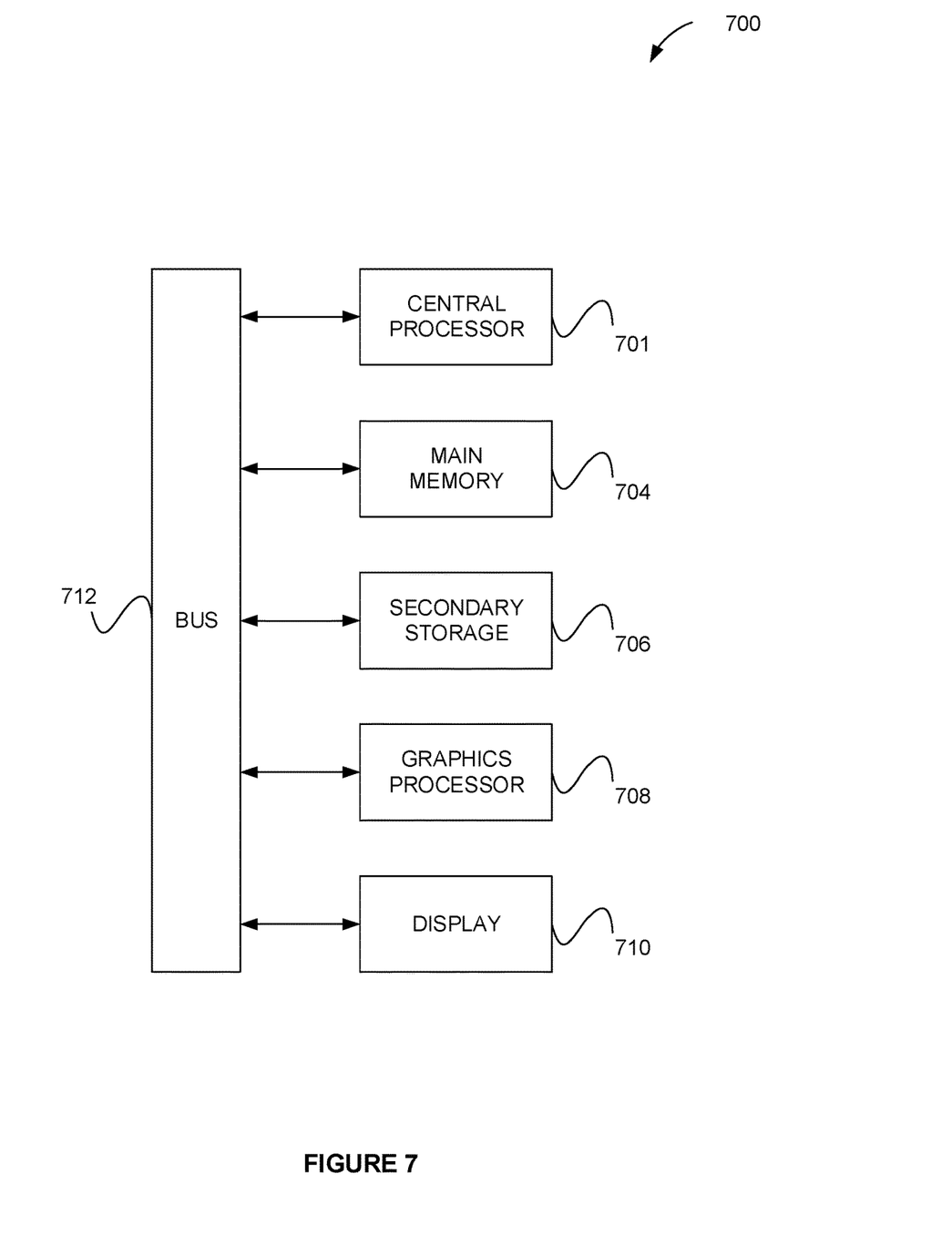
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. However, it is to be appreciated that the system 700 may be implemented in any desired environment.

As shown, a system 700 is provided including at least one central processor 702 which is connected to a bus 712. The system 700 also includes main memory 704 [e.g., hard disk drive, solid state drive, random access memory (RAM), etc.]. The system 700 also includes a graphics processor 708 and a display 710.

The system 700 may also include a secondary storage 706. The secondary storage 706 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 706, and/or any other memory, for that matter. Such computer programs, when executed, enable the system 700 to perform various functions (as set forth above, for example). Memory 704, secondary storage 706 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method of service placement in a network, comprising:
    storing information on a collection of services that are configured to be performed in a dynamic order;
    identifying, from the information, one or more interdependencies between at least a portion of the services;
    dividing the collection of services into one or more subsets of the services, based on the one or more interdependencies, wherein each subset of the one or more subsets includes a portion of the services that are interdependent with one another;
    for each subset of the one or more subsets, combining the portion of the services included therein into a composite service;
    for each composite service, assigning the composite service to a single service node of a plurality of service nodes; and
    deploying, by each service node of the plurality of service nodes, the services in the composite service assigned thereto.

2. The method of claim 1, further comprising: receiving at least one other interdependency from a user.

3. The method of claim 2, wherein the collection of services is divided into the one or more subsets of the services, based on the at least one other interdependency from the user.

4. The method of claim 1, further comprising receiving at least one rule from a user.

5. The method of claim 4, wherein the collection of services is divided into the one or more subsets of the services, based on the at least one rule from the user.

6. The method of claim 1, wherein the plurality of service nodes are autonomous.

7. The method of claim 1, wherein each composite service is configured for being moved from the service node assigned thereto to at least one other service node of the plurality of service nodes.

8. The method of claim 1, wherein wherein a first composite service is assigned to a first service node of the plurality of service nodes, and wherein a second composite service is assigned to a different second service node of the plurality of service nodes.

9. The method of claim 1, further comprising: identifying a cost associated with each composite service, and assigning the composite service to the single service node, based on the cost.

10. The method of claim 9, wherein the cost includes a cost in resources.

11. The method of claim 1, wherein the information on the collection of services is at least one of a graph, an array, a table, or a digital structure.

12. The method of claim 1, wherein the one or more interdependencies are received from at least one user or automatically generated utilizing heuristics.

13. The method of claim 1, wherein each composite service includes a metric that is a sum of a plurality of metrics associated with the portion of the services included therein.

14. The method of claim 1, wherein each composite service includes a metric that is a largest one of a plurality of metrics associated with the portion of the services included therein.

15. The method of claim 1, wherein assigning the composite service utilizes a first fit decreasing (FFD) bin pack algorithm.

16. The method of claim 1, wherein the information defines a service graph that includes the collection of services, and wherein the composite service represented by a sub-graph of the service graph.

17. The method of claim 1, wherein assigning the composite service to a single service node of a plurality of service nodes includes:
    determining a composite resource requirement for the composite service, the composite resource requirement being determined based on individual resource requirements of each service included in the composite service;
    determining a resource capacity of the single service e node; and
    assigning the composite service to the single service node, based on the determined composite resource requirement and the determined resource capacity.

18. An apparatus, comprising:
    memory configured to store information on a collection of services that are configured to be performed in a dynamic order;
    a policy manager in communication with the memory, the policy manager configured to identify, from the information, one or more interdependencies between at least a portion of the services;
    a service orchestrator in communication with the policy manager, the service orchestrator configured to:
        divide the collection of services into one or more subsets of the services, based on the one or more interdependencies, wherein each subset of the one or more subsets includes a portion of the services that are interdependent with one another, and
        for each subset of the one or more subsets, combine the portion of the services included therein into a composite service; and
    a controller in communication with the service orchestrator, the controller configured to:
        for each composite service, assign the composite service to a single service node of a plurality of service nodes;

wherein each service node of the plurality of service nodes deploys the services in the composite service assigned thereto.

19. The apparatus of claim 18, wherein the policy manager is configured for identifying the one or more interdependencies by receiving the one or more interdependencies from at least one user.

20. The apparatus of claim 18, wherein the policy manager is configured for identifying the one or more interdependencies by automatically generating the one or more interdependencies utilizing heuristics.

21. The apparatus of claim 18, wherein the apparatus is configured for modeling the collection of services as a directed acyclic graph (DAG), based on the one or more interdependencies.

22. The apparatus of claim 18, wherein the apparatus is configured such that each composite service includes a metric that is a sum of a plurality of metrics associated with the portion of the services included therein.

23. The apparatus of claim 18, wherein the apparatus is configured such that each composite service includes a metric that is a largest one of a plurality of metrics associated with the portion of the services included therein.

24. The apparatus of claim 18, wherein the controller is configured to assign the composite service utilizing a first fit decreasing (FFD) bin pack algorithm.

25. An apparatus, comprising:
memory configured to store information on a collection of services that are configured to be performed in a dynamic order;
one or more processors in communication with the memory, the one or more processors configured to:
identify, from the information, one or more interdependencies between at least a portion of the services;
divide the collection of services into one or more subsets of the services, based on the one or more interdependencies, wherein each subset of the one or more subsets includes a portion of the services that are interdependent with one another; and
for each subset of the one or more subsets, combine the portion of the services included therein into a composite service; and a controller in communication with the one or more processors, the controller configured to:
for each composite service, assign the composite service to a single service node of a plurality of service nodes;
wherein each service node of the plurality of service nodes deploys the services in the composite service assigned thereto.

26. A service placement system, comprising:
a non-transitory memory storage comprising instructions; and
one or more processors in communication with the memory storage, wherein the one or more processors execute the instructions to:
store information on a collection of services that are configured to be performed in a dynamic order;
identify, from the information, one or more interdependencies between at least a portion of the services;
divide the collection of services into one or more subsets of the services, based on the one or more interdependencies, wherein each subset of the one or more subsets includes a portion of the services that are interdependent with one another;
for each subset of the one or more subsets, combine the portion of the services included therein into a composite service;
for each composite service, assign the composite service to a single service node of a plurality of service nodes; and
deploy, by each service node of the plurality of service nodes, the services in the composite service assigned thereto.

27. The system of claim 26, wherein deploying the services in the composite service includes performing the services in the composite service.

28. The system of claim 26, wherein the system is configured such that each composite service is configured for being moved from the service node assigned thereto to at least one other service node of the plurality of service nodes.

* * * * *